US007254815B2

(12) United States Patent
Laschkewitsch et al.

(10) Patent No.: US 7,254,815 B2
(45) Date of Patent: Aug. 7, 2007

(54) METHOD AND APPARATUS FOR IMPLEMENTING DISTRIBUTED EVENT MANAGEMENT IN AN EMBEDDED SUPPORT PROCESSOR COMPUTER SYSTEM

(75) Inventors: Clinton Gene Laschkewitsch, Stewartville, MN (US); Paul Edward Movall, Rochester, MN (US); Ward Ray Nelson, Stewartville, MN (US)

(73) Assignee: International Business Machines Corporation, Armonk, NY (US)

( * ) Notice: Subject to any disclaimer, the term of this patent is extended or adjusted under 35 U.S.C. 154(b) by 824 days.

(21) Appl. No.: 10/422,659

(22) Filed: Apr. 24, 2003

(65) Prior Publication Data

US 2004/0216136 A1 Oct. 28, 2004

(51) Int. Cl.
*G06F 9/46* (2006.01)
(52) U.S. Cl. ............... 719/318; 719/317; 719/328; 709/202
(58) Field of Classification Search ............... 719/310, 719/317, 318, 328; 709/202, 224; 710/15
See application file for complete search history.

(56) References Cited

U.S. PATENT DOCUMENTS

| | | | | | |
|---|---|---|---|---|---|
| 5,062,040 | A | * | 10/1991 | Bishop et al. | 719/318 |
| 5,369,749 | A | * | 11/1994 | Baker et al. | 718/104 |
| 5,790,788 | A | * | 8/1998 | Badovinatz et al. | 709/201 |
| 6,108,700 | A | * | 8/2000 | Maccabee et al. | 709/224 |
| 6,115,646 | A | * | 9/2000 | Fiszman et al. | 700/181 |
| 6,131,131 | A | * | 10/2000 | Bassman et al. | 710/15 |
| 6,366,926 | B1 | * | 4/2002 | Pohlmann et al. | 707/104.1 |
| 6,647,432 | B1 | * | 11/2003 | Ahmed et al. | 719/318 |
| 6,714,992 | B1 | * | 3/2004 | Kanojia et al. | 719/321 |
| 6,742,051 | B1 | * | 5/2004 | Bakshi et al. | 719/318 |
| 6,892,264 | B2 | * | 5/2005 | Lamb | 710/301 |
| 6,961,940 | B2 | * | 11/2005 | Hunsinger et al. | 719/318 |
| 6,978,462 | B1 | * | 12/2005 | Adler et al. | 719/318 |
| 7,058,968 | B2 | * | 6/2006 | Rowland et al. | 726/1 |
| 2002/0165962 | A1 | * | 11/2002 | Alvarez et al. | 709/226 |
| 2002/0188766 | A1 | * | 12/2002 | Vuppula | 709/318 |
| 2004/0031040 | A1 | * | 2/2004 | Chheda et al. | 719/318 |
| 2004/0190546 | A1 | * | 9/2004 | Jackson | 370/463 |

OTHER PUBLICATIONS

Hongeng et al "Multi-Agent Event Recognition", 2001 IEEE, pp. 84-91.*
Dasgupta "Agent Based Peer-to-Peer Systems", 2002 IEEE, pp. 663-666.*
Iwao et al. "Collaboration Among Agents in Logical Network of Peer-To-Peer Services", 2002 IEEE, pp. 1-2.*

* cited by examiner

*Primary Examiner*—William Thomson
*Assistant Examiner*—Van H. Nguyen
(74) *Attorney, Agent, or Firm*—Joan Pennington

(57) ABSTRACT

Distributed event management in an embedded support processor computer system includes an embedded support processor having an event distribution agent used to communicate with local processes internal to the embedded support processor. A process communicates with the event distribution agent of the embedded support processor and registers for one or more events. Another process signals an event to the event distribution agent of the embedded support processor. The event distribution agent of the embedded support processor notifies each registered process of the signaled event. The event distribution agent of the embedded support processor is used to communicate with a peer event distribution agent included in a main processor of the embedded support processor computer system, and to communicate over a network with a peer event distribution agent included in an attached device, such as a personal computer.

16 Claims, 8 Drawing Sheets

METHOD AND APPARATUS FOR IMPLEMENTING DISTRIBUTED EVENT MANAGEMENT IN AN EMBEDDED SUPPORT PROCESSOR COMPUTER SYSTEM

FIELD OF THE INVENTION

The present invention relates generally to the data processing field, and more particularly, relates to a method, apparatus and computer program product for implementing distributed event management in an embedded support processor computer system.

DESCRIPTION OF THE RELATED ART

As computer systems have become increasingly more complex with multiple microprocessors, memory systems, and I/O attachments, an embedded support processor is sometimes used to perform functions that may help with performance or improve the reliability, availability, and serviceability of the overall computer system. The embedded support processor is typically connected to the main processors of the computer system by some physical attachment such as a bus or other connection to allow data to be exchanged. The embedded support processor may also have a connection to communication facilities which allow it to exchange data, for example, on a local area network (LAN) or wide area network (WAN).

The embedded support processor may include a simple operating system kernel that provides an operating environment for multiple, independent units of work referred to as processes. Many of these processes are monitors which have no real work to perform until something occurs that wakes them up to perform some function. These processes may be monitoring the health of hardware components either running within the embedded support processor or running within the main processors of the computer system, or perhaps monitoring the addition or removal of hardware components from the computer system. Communication among these multiple independent processes can be done with a variety of mechanisms.

Of the many processes that a computer system may run, some processes only become active as a result of some event occurring. Until the event occurs, the process has nothing to do. One design is to use a polling scheme in which the process wakes up periodically and checks to see if the event of interest has occurred. If the event has not occurred, it goes back to sleep. There are problems with such a design, such as excessive use of processor cycles to continually check for the event occurrence, correctly selecting the sleep interval without missing the event, or the large latency that can occur between the time an event occurs and the next poll for the event.

A need exists for an improved mechanism for implementing event management in an embedded support processor computer system.

SUMMARY OF THE INVENTION

A principal object of the present invention is to provide a method, apparatus and computer program product for implementing distributed event management in an embedded support processor computer system. Other important objects of the present invention are to provide such method, apparatus and computer program product for implementing distributed event management in an embedded support processor computer system substantially without negative effect and that overcome many of the disadvantages of prior art arrangements.

In brief, a method, apparatus and computer program product are provided for implementing distributed event management in an embedded support processor computer system. An embedded support processor includes an event distribution agent used to communicate with local processes internal to the embedded support processor. A process communicates with the event distribution agent of the embedded support processor and registers for one or more events. Another process signals an event to the event distribution agent of the embedded support processor. The event distribution agent of the embedded support processor notifies each registered process of the signaled event.

In accordance with features of the invention, the event distribution agent of the embedded support processor is used to communicate with a peer event distribution agent included in a main processor of the embedded support processor computer system. The event distribution agent of the embedded support processor also is used to communicate over a network with a peer event distribution agent included in an attached device, such as a personal computer. The peer event distribution agents are used to communicate with local processes internal to the main processor and attached device and to notify or forward signaled events with the event distribution agent of the embedded support processor.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In accordance with features of the preferred embodiments, event management apparatus is used to communicate between processes internal to an embedded support processor as well as to processes running remotely on a main processor of the embedded support processor computer system or on other devices attached to the embedded support processor over a local area network (LAN) or wide area network (WAN).

Figure 1:
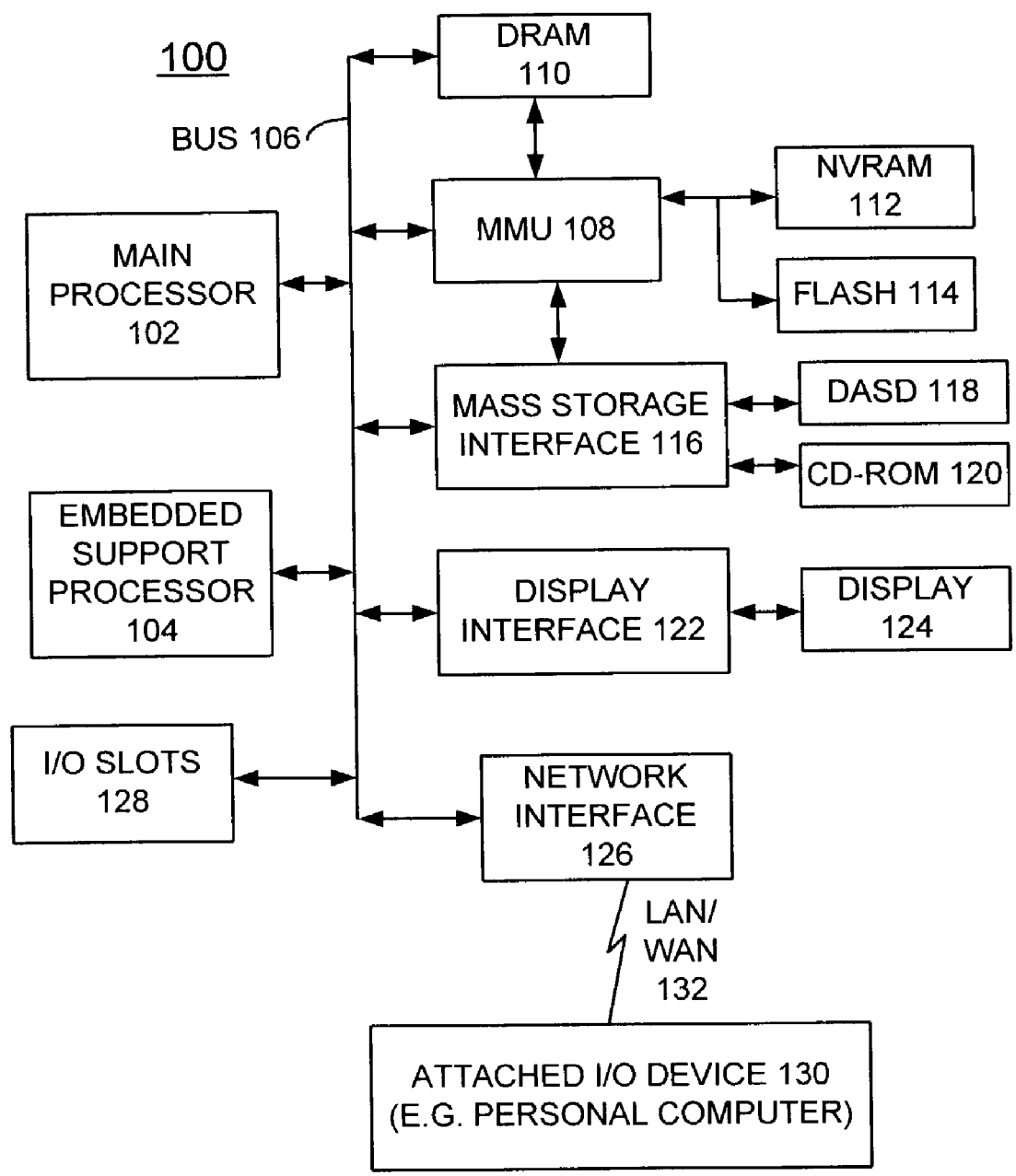
FIG. 1 is a block diagram illustrating an embedded support processor computer system for implementing distributed event management in accordance with the preferred embodiment.

Referring now to the drawings, in FIG. 1 there is shown an embedded support processor computer system generally designated by the reference character 100 for implementing distributed event management in accordance with the preferred embodiment. Embedded support processor computer system 100 includes a main processor 102 and an embedded support processor 104 coupled by a system bus 106 to a memory management unit (MMU) 108 and system memory including a dynamic random access memory (DRAM) 110, a nonvolatile random access memory (NVRAM) 112, and a flash memory 114. The system bus 106 may be private or public, while present invention is not limited to a particular topology used. A mass storage interface 116 coupled to the system bus 106 and MMU 108 connects a direct access storage device (DASD) 118 and a CD-ROM drive 120 to the main processor 102 and the embedded support processor 104. Embedded support processor computer system 100 includes a display interface 122 connected to a display 124, a network interface 126, and input/output (I/O) slots 128 coupled to the system bus 106. An attached I/O device 130, such as a personal computer 130 is attached to the embedded support processor computer system 100 via a LAN or WAN 132. Embedded support processor computer system 100 is shown in simplified form sufficient for understanding the present invention.

It should be understood that the present invention is not limited for use with the illustrated embedded support processor computer system 100. The illustrated embedded support processor computer system 100 is not intended to imply architectural limitations. The present invention can be used with various computer systems having an embedded support processor and various other internal hardware or peripheral devices, for example, multiple main processors.

In accordance with features of the preferred embodiments, a single process is allowed to communicate to many other processes about the occurrence of some event. A process which signals an event or a process which wishes to be told about an event can be running anywhere within the communications domain of the embedded support processor 104. This includes, for example, a process that could be running on the embedded support processor 104, the computer system's main processor 102, or on some other device 130 attached, for example, by a LAN or WAN 132 to the embedded support processor 104.

In accordance with features of the preferred embodiments, a process which signals that some event has occurred is not required to know if there are many other processes interested in the event or if there are no other processes interested in the event. The event is communicated both to local processes running on the embedded support processor 104 as well as to processes running elsewhere. Neither the signaler process of the event nor the registered processes of the event need to care about where processes are running. Processes that wish to be notified about an event can dynamically register or unregister for that event.

In accordance with features of the preferred embodiments, a process that has registered for one or more events is able to wait for an event occurrence without using processor cycles. For example, such process can be put to sleep until such time an event of interest is signaled.

In accordance with features of the preferred embodiments, an event distribution agent is provided which acts on behalf of application programming interface (API) requests. The event distribution agent is a distributed agent with a peer event distribution agent running in a process on all processor including the main processor 102, and any attached I/O devices 130 of interest. For example, one event distribution agent runs on the embedded support processor 104. Another agent runs on the main processor 102 of the computer system 100. If the embedded support processor 104 is connected to other devices 130 over the LAN or WAN 132, a peer agent can also run on any or all of those devices. The event distribution agents exchange information between other peer event distribution agents and local processes running in the same environment as the respective peer event distribution agent. For example, the agent running on the embedded support processor 104 exchanges information with other processes also running on the embedded support processor 104. As another example, the peer distribution agent running on the main processor 102 of the computer system 100 exchanges information with other processes also running on the main processor 102. Similarly, the peer distribution agent running on the attached I/O device 130 exchanges information with other processes also running on the attached I/O device 130.

Information is exchanged between the event distribution agent of the embedded support processor 104 and peer event distribution agents on the main processor 102 and the attached I/O device 130. Information exchange between the event distribution agents occurs initially when agents discover other connected agents. This information exchange also occurs when an agent determines that an event must be sent from the environment it is running in to an environment of another agent. One of various known techniques using either public communication protocols or private designs can be used for communications between the event distribution agents. Thus, the occurrence of an event which is signaled by a process running on one of the processor environments, such as, the embedded support processor 104, main system processor 102, or an attached device 130 can wake up a local process or processes to perform some function or also wake up processes in remote environments and cause them to perform some function. None of the processes, such as processes 202, 204 of FIG. 2 need to be concerned about where other processes run or how the event management system exchanged information between the various processes.

Figure 2:
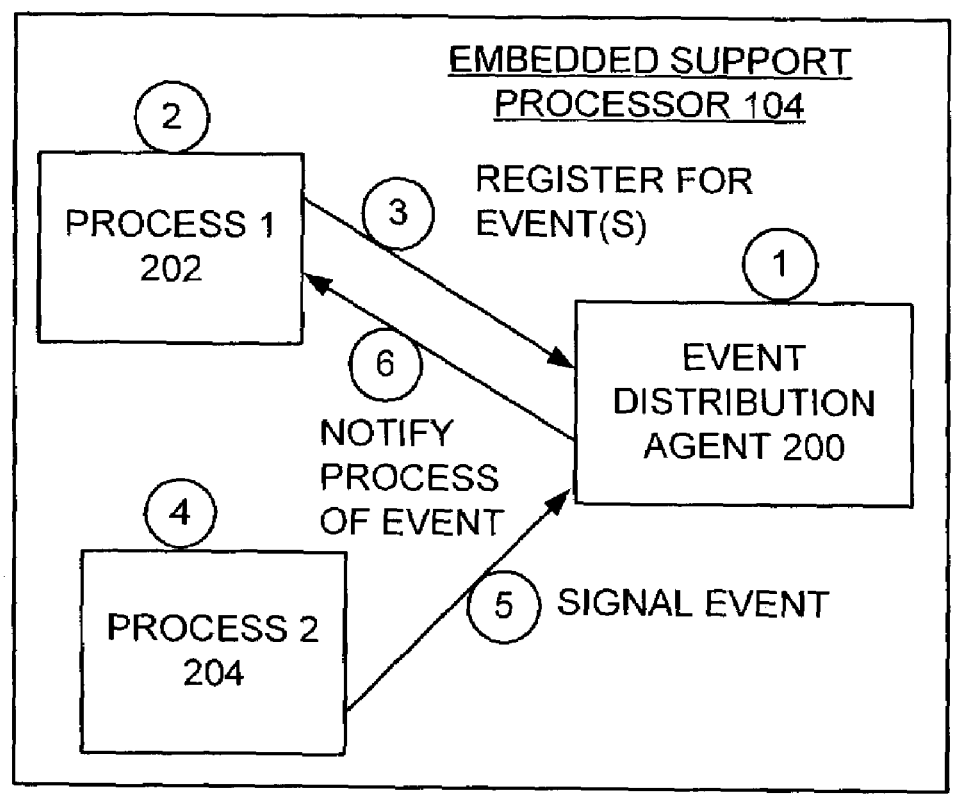
FIG. 2 is a block diagram illustrating an embedded support processor of the embedded support processor computer system of FIG. 1 for implementing distributed event management in accordance with the preferred embodiment.

Referring now to FIG. 2, first, a simple, non-distributed environment, event management on the embedded support processor 104 is illustrated and described. In FIG. 2, there is shown the embedded support processor 104 in accordance with the preferred embodiment including an event distribution agent 200, and a plurality of local processes 202, 204. The event distribution agent 200 provides an application programming interface (API) for programmers which allow them to write computer programs which use events. The event distribution agent 200 provides interfaces allowing a program running in a local process of the embedded support processor 104 to signal the occurrence of an event, to indicate that a process wants to be told about an event or register for an event, to indicate that a process no longer wants to be told about an event or register for an event, or to go to sleep waiting until an event of interest is signaled. As shown in FIG. 2, the embedded support processor 104 includes local processes 1, 202; and 2, 204.

Figure 3:
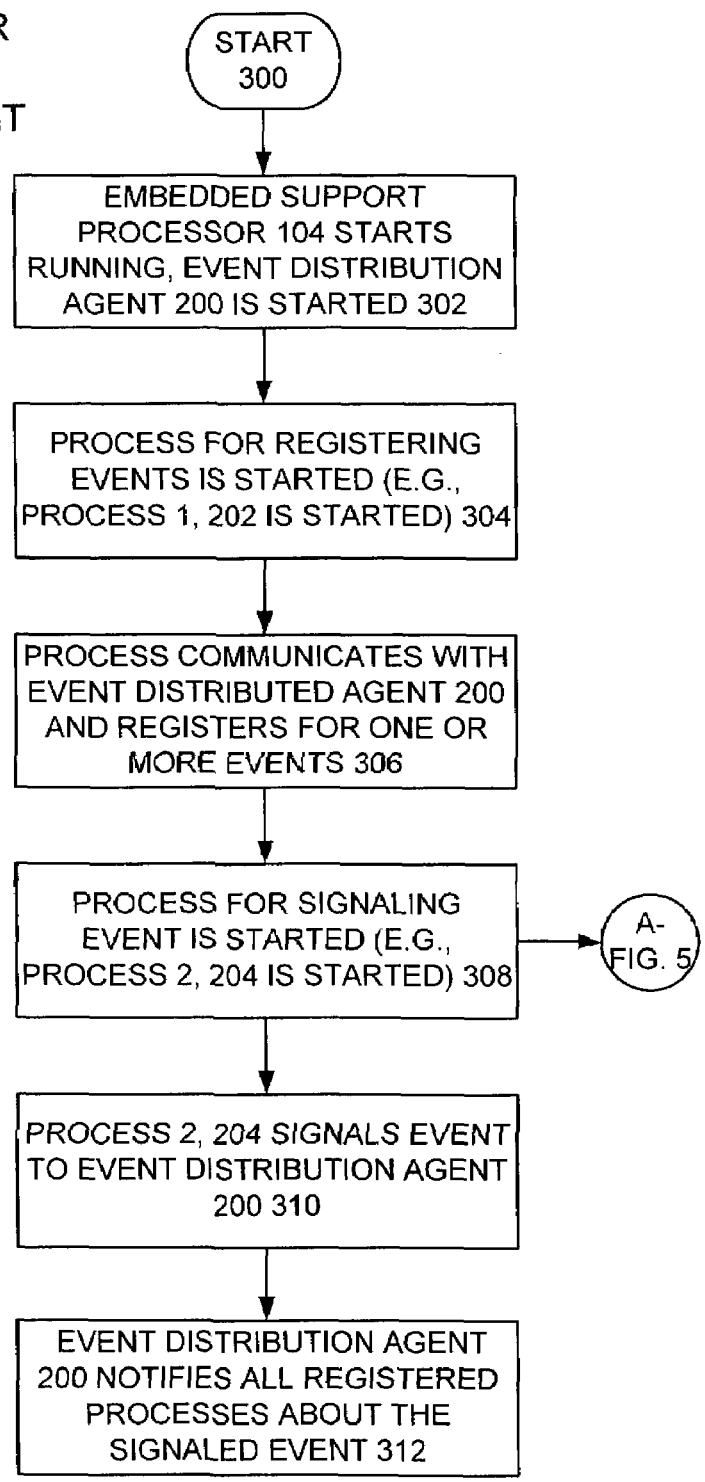
FIG. 3 is a flow chart illustrating exemplary steps performed by the embedded support processor of FIG. 2 for implementing distributed event management in accordance with the preferred embodiment.

Referring also to FIG. 3, exemplary steps performed by the embedded support processor computer system 100 are shown starting at block 300 for implementing distributed event management with corresponding steps indicated by encircled numbers provided in FIG. 2. As indicated in a block 302, embedded support processor 104 starts running, the event distribution agent 200 is started, also indicated by step 1.

One of the earliest processes started on the embedded support processor 104 is the event distribution agent 200 at block 302. Since the support processor 104 is started before the main processor 102 on the computer system 100 and before any attached devices over a LAN or WAN connect to the embedded support processor 104, initially the event distribution agent 200 identifies no other event distribution agents.

A process for registering events is started as indicated in a block 304, for example, process 1, 202 is started indicated by step 2. The process 1, 202 communicates with the event distribution agent 200 and registers for one or more events as indicated in a block 306, and step 3. The event distribution agent 200 keeps track of all local processes that wish to be notified of events, for example, creating an event registration table (not shown), or otherwise storing events for registered processes. Initially, this table is empty. The event distribution agent 200 also stores information about peer event distribution agents, for example, creating another table (not shown) that contains information about peer event distribution agents. Initially, this table is also empty. Processes that wish to know about events can dynamically register for events and unregister from events without affecting the signaling process.

As other processes are started on the embedded support processor 104, some processes will be interested in the occurrence of events. Such processes at block 304 use the API that causes exchange of information with the event distribution agent 200 about the particular events of interest. This API registers a process for one or more events. Information is exchanged between these registering processes and the local event distribution agent 200 to update the stored information about events for registered processes or the event registration table of the event distribution agent.

Similarly, if some registered process wishes to later on remove its registration, an API is used that causes exchange of information with the event distribution agent 200 for subsequent updating of the event registration table. After unregistering, a process is no longer notified about these signaled events.

A process for signaling an event is started, for example, process 2, 204 as indicated in a block 308, and step 4. When some process, such as process 2, 204, wishes to tell other processes about the occurrence of an event, the process also uses an API to exchange information with the event distribution agent 200. Optionally, the signaling process 2, 204 may choose to wait for the agent to complete the signal request.

Figure 5:
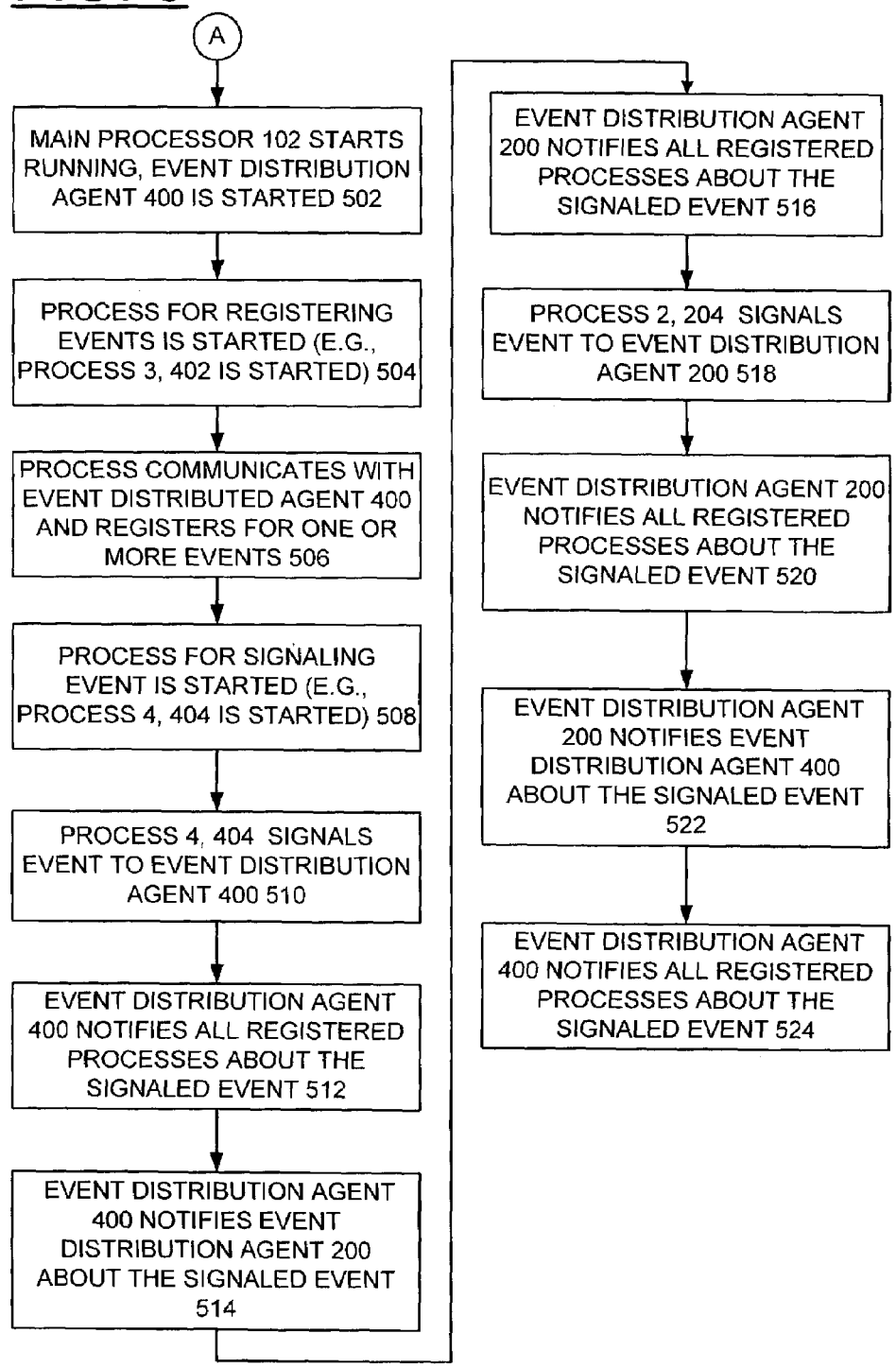
FIG. 5 is a flow chart illustrating exemplary steps performed by the embedded support processor of FIG. 4 for implementing distributed event management in accordance with the preferred embodiment.
Figure 6:
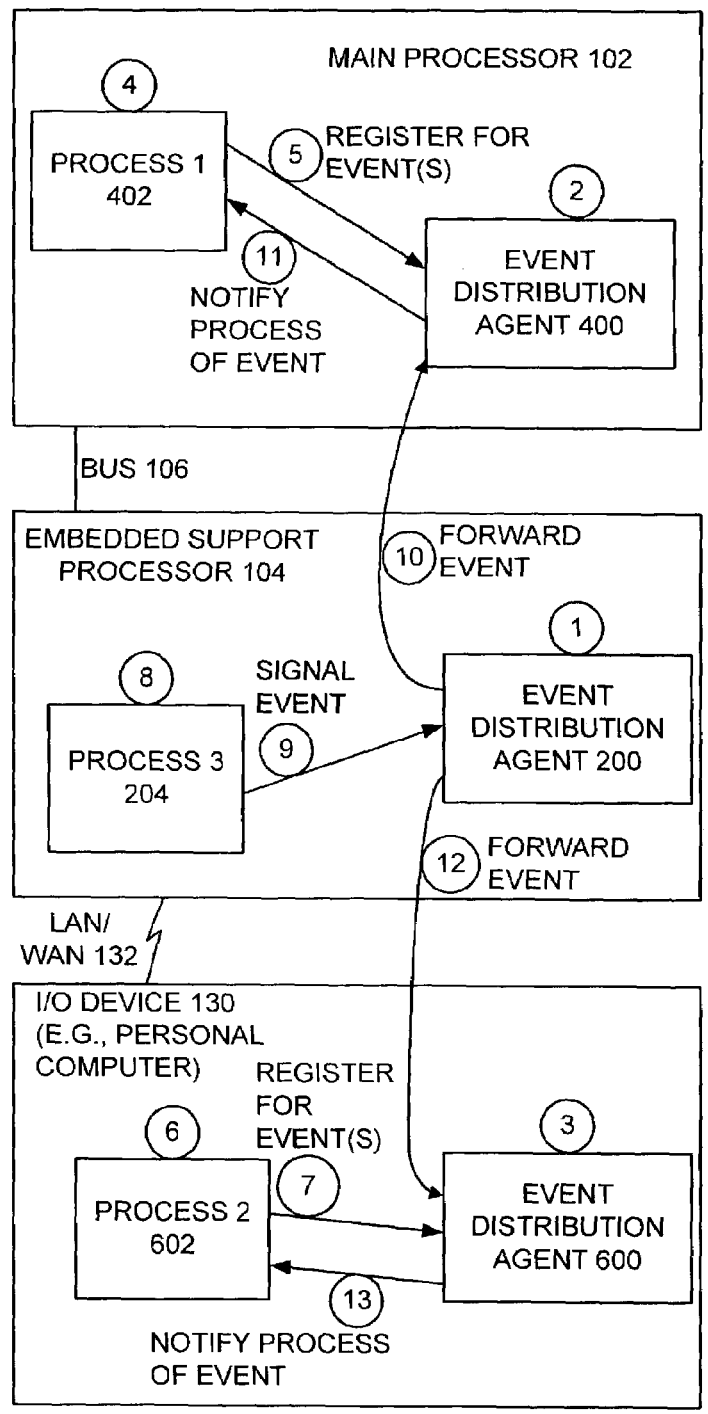
FIG. 6 is a block diagram illustrating the embedded support processor, main processor, and an attached I/O device of the embedded support processor computer system of FIG. 1 for implementing distributed event management in accordance with the preferred embodiment.

The embedded support processor computer system 100 with the main processor 102 including an event distribution agent is illustrated and described with respect to FIGS. 5 and 6. Then following block 308 in FIG. 3, the exemplary steps continue following entry point A in FIG. 5.

At some point, process 2, 204 signals an event to the event distribution agent 200 as indicated in a block 310, and step 5. The event distribution agent 200 uses its registration table to determine if there are any processes currently registered for the signaled event. If there are none, the agent's job is complete. If there are, the agent exchanges information with each of those registered processes to let each one know that an event of interest has occurred. The event distribution agent 200 notifies all registered processes about the signaled event as indicated in a block 312, and step 6.

Registered processes, such as process 1, 202 listen for the occurrence of events they are interested in by using an API of the event distribution agent to monitor for the occurrence. If no events have occurred, the registered process may be put to sleep indefinitely or for some period of time until either a registered event is signaled or until a set time period has elapsed. Since this monitoring function can block continued execution by the process until an event is signaled or time period elapses, the monitoring process may choose to do this in a child process or thread if the process has other meaningful work to perform.

Event occurrences flow from some signaling process, such as process 2, 204 that wishes to signal other processes to the event distribution agent 200 and then from the event distribution agent to one or more registered processes, such as process 1, 202. The signaling process does not know or care about which processes or how many processes are eventually told about the event occurrence.

Figure 4:
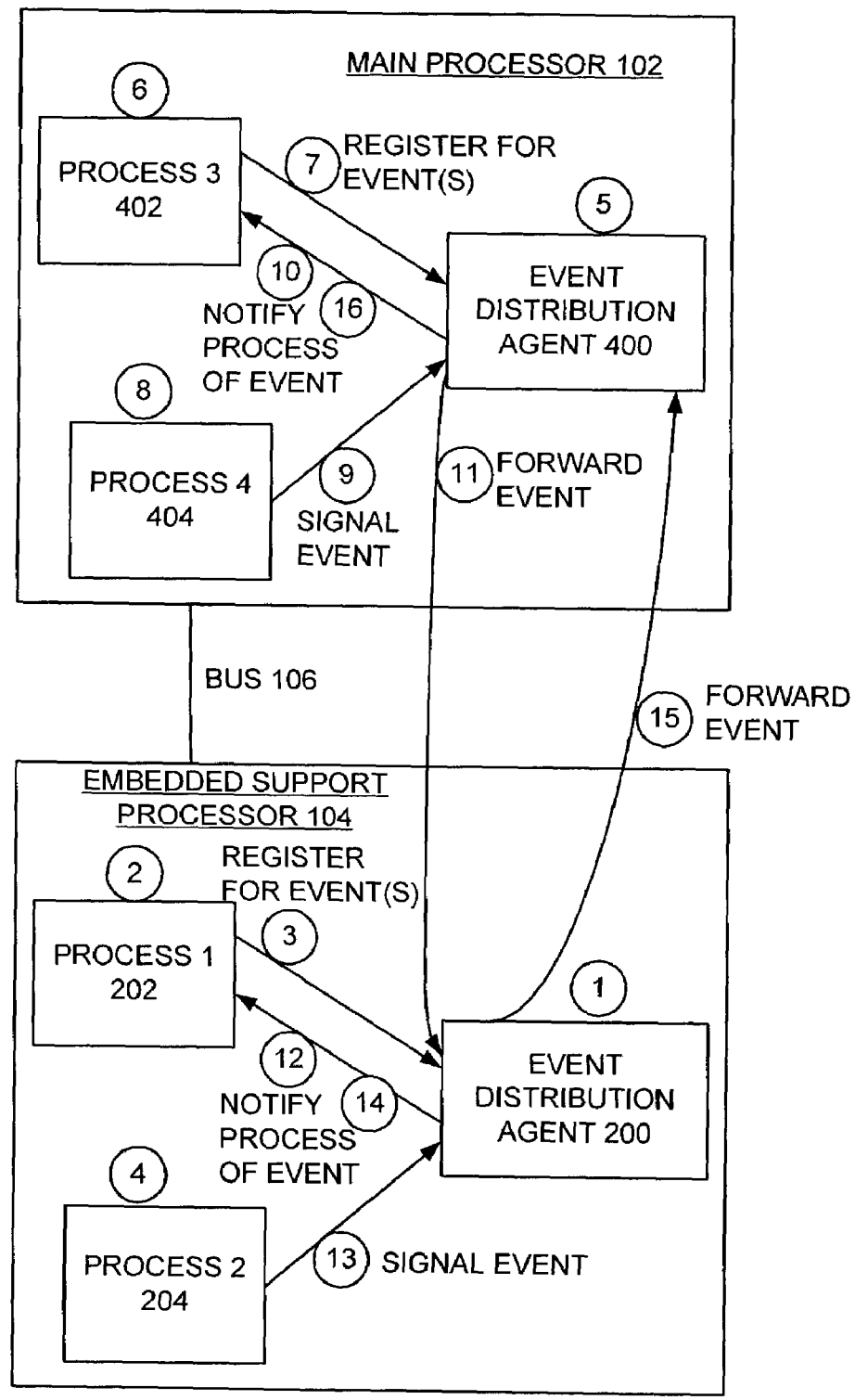
FIG. 4 is a block diagram illustrating the embedded support processor and main processor of the embedded support processor computer system of FIG. 1 for implementing distributed event management in accordance with the preferred embodiment.

Referring to FIGS. 4 and 5 the method for implementing distributed event management in accordance with the preferred embodiment for the embedded support processor 104, and the main processor 102 is now described. As shown in FIG. 4, the embedded support processor 104 similarly includes the event distribution agent 200 and processes 1, 202 and 2, 204 having the same reference character as described above, and the main processor 102 includes an event distribution agent 400, and a plurality of processes 3, 402 and 4, 404. The process 3, 402 is interested in registering for events and process 4, 402 is a signaling process that will signal an event.

As the operating system software or environment is started on the main processor 102, the event distribution agent 400 is started on the main processor. Similar to the event distribution agent 200 of embedded support processor 104, event distribution agent 400 stores process and event information, for example, creating its own event registration table (not shown) that is used by the event distribution agent 400 to manage information exchanged with processes running on the main processor 102. Those local processes of the main processor 102 can also register for events, unregister for events, listen for events, or signal events by interaction with their local event distribution agent 400.

The event distribution agent 400 that is started on the main processor 102 can communicate with the event distribution agent running on the support processor 104. Both event distribution agents 200, 400 now have a communication path between them that allows for events to flow from the environment of the embedded support processor 104 to the environment of the main processor 102 and vice versa.

FIGS. 3 and 5 illustrates exemplary steps performed by the embedded support processor computer system 100 starting at block 300 for implementing distributed event management with corresponding step encircled numbers provided in FIG. 4. The first four steps 1-4 indicated in FIG. 4, and at blocks 302, 304, 306, and 308 in FIG. 3, are the same as described with respect to FIGS. 2 and 3. As indicated in a block 502 following entry point A in FIG. 5, the main processor 102 starts running and the event distribution agent 400 is started, as indicated by step 5. Process 3, 402 for registering for events is started as indicated in a block 504, and step 6. Process 3, 402 communicates with the event distribution agent 400 and registers for the desired one or more events as indicated in a block 506, and step 7. Process 4, 404 for signaling an event is started as indicated in a block 508, and step 8. Process 4, 404 signals an event to the event distribution agent 400 as indicated in a block 510, and step 9. The event distribution agent 400 notifies all registered processes of the main processor 102 about the signaled event as indicated in a block 512, and step 10.

The event distribution agent 400 notifies the event distribution agent 200 about the signaled event as indicated in a block 514, and step 11. The event distribution agent 200 notifies all registered processes of the embedded support processor 104 about the signaled event as indicated in a block 516, and step 12. Process 2, 202 signals an event to the event distribution agent 200 as indicated in a block 518, and step 13. The event distribution agent 200 notifies all registered processes of the embedded support processor 104 about the signaled event as indicated in a block 520, and step 14. The event distribution agent 200 notifies the event distribution agent 400 about the signaled event as indicated in a block 522, and step 15. The event distribution agent 400 notifies all registered processes of the main processor 102 about the signaled event as indicated in a block 524, and step 16.

Figure 7:
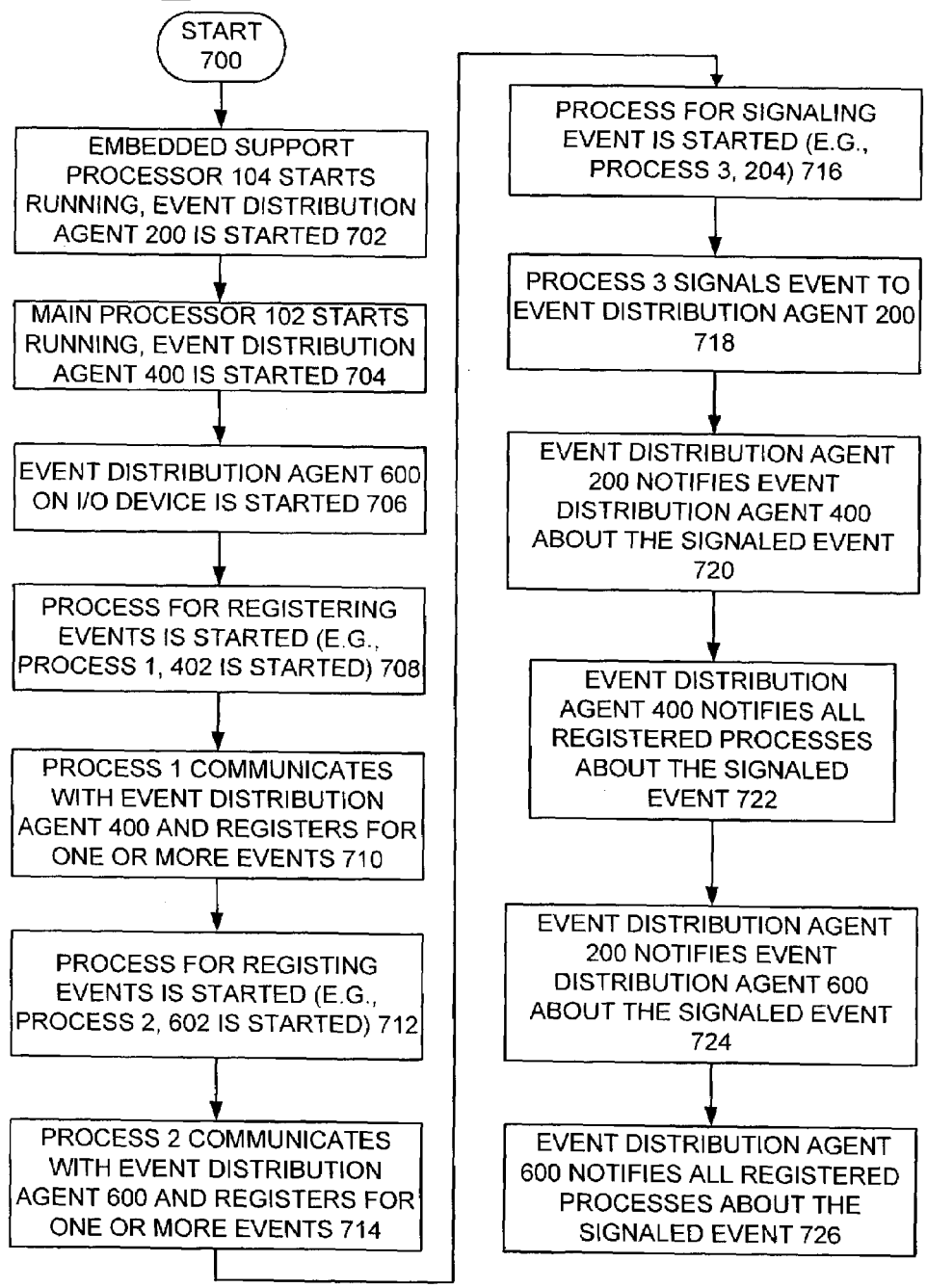
FIG. 7 is a flow chart illustrating exemplary steps performed by the embedded support processor of FIG. 6 for implementing distributed event management in accordance with the preferred embodiment.

FIGS. 6 and 7 illustrate the method for implementing distributed event management in accordance with the preferred embodiment for the embedded support processor 104, main processor 102, and an attached I/O device 130. FIG. 7 illustrates exemplary steps performed by the embedded support processor computer system 100 starting at block 700 for implementing distributed event management with corresponding step encircled numbers provided in FIG. 6. In the illustrated example of FIGS. 6 and 7, the event distribution agent event distribution agent 400 of the main processor 102 is shown with a process 1, 402 that is interested in registering for events. The event distribution agent 200 of the embedded support processor 104 is shown with a process 3, 202 that is a signaling process that will signal an event. The attached I/O device 130, such as a personal computer includes an event distribution agent 600 that is shown with a process 2, 602 that is interested in registering for events.

Similar to events flowing between processes running on the embedded support processor 104 and processes running on the main processor 102, events can also be sent between the embedded support processor 104 and some attached I/O device 130 over the LAN or WAN 132. When the I/O device 130 attaches to the embedded support processor 104, the event distribution agent 600 on the I/O device and the event distribution agent on the embedded support processor discover each other and establish a communication path for future exchange of events.

As indicated in a block 702 in FIG. 7, and step 1 of FIG. 6, the embedded support processor 104 starts running, the event distribution agent 200 is started. The main processor 102 starts running, the event distribution agent 400 is started as indicated in a block 704, and step 2. Next the event distribution agent 600 on the I/O device 130 is started as indicated in a block 706, and step 3. Before the I/O device 130 is ready to attach to the embedded support processor 104, the event distribution agent 600 is started.

A process for registering events is started, for example, process 1, 402 is started as indicated in a block 708, and step 4. Process 1, 402 communicates with the event distribution agent 400 and registers for one or more events as indicated in a block 710, and step 5. A process for registering an event is started, for example, process 2, 602 as indicated in a block 712, and step 6. Process 2, 602 communicates with the event distribution agent 600 and registers for one or more events as indicated in a block 714, and step 7. Process 3, 204 for signaling an event is started as indicated in a block 716, and step 8. Process 3, 204 signals an event to the event distribution agent 200 as indicated in a block 718, and step 9. The event distribution agent 200 notifies event distribution agent 400 about the signaled event at step 9 as indicated in a block 720, and step 10. The event distribution agent 400 notifies all registered processes of the main processor 102 as indicated in a block 722, and step 11. The event distribution agent 200 notifies event distribution agent 600 about the signaled event at step 9 as indicated in a block 724, and step 12. The event distribution agent 600 notifies all registered processes of the I/O device 130 about the signaled event as indicated in a block 726, and step 13.

It should be understood that the present invention is not limited to the illustrated examples provided in FIGS. 2-7. For example, it should be understood that the I/O device 130 could start first and the event distribution agent 600 is started before the computer system 100 starts, then the event distribution agent 200 of the embedded processor 104 starts. Likewise, it is possible that the event distribution agent 400 of the main processor 102 is started before the event distribution agent 200 of the embedded processor 104 starts.

Figure 8:
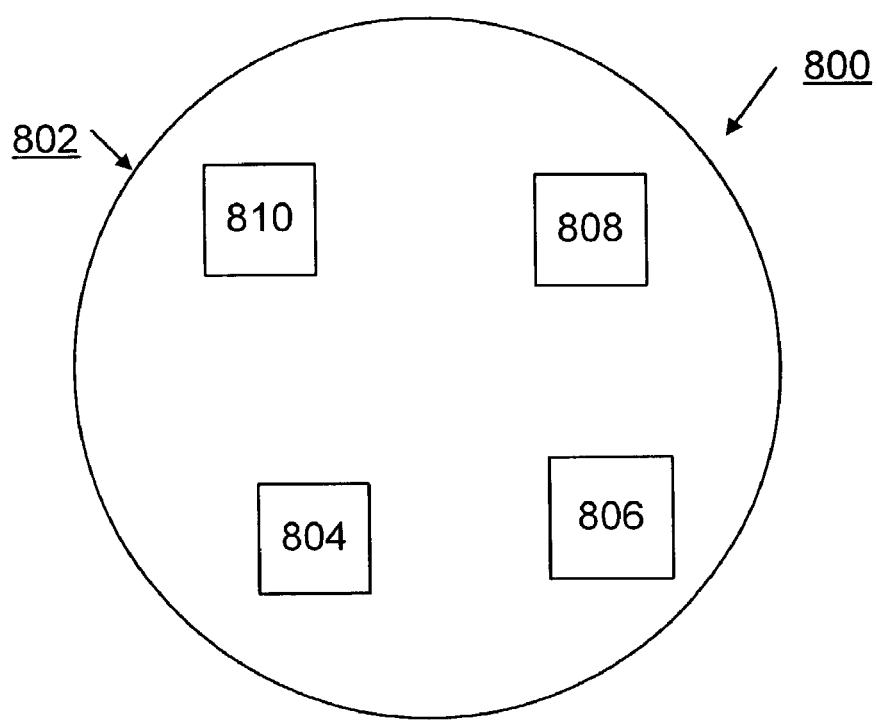
FIG. 8 is a block diagram illustrating a computer program product in accordance with the preferred embodiment.

Referring now to FIG. 8, an article of manufacture or a computer program product 800 of the invention is illustrated. The computer program product 800 includes a recording medium 802, such as, a floppy disk, a high capacity read only memory in the form of an optically read compact disk or CD-ROM, a tape, a transmission type media such as a digital or analog communications link, or a similar computer program product. Recording medium 802 stores program means 804, 806, 808, 810 on the medium 802 for carrying out the methods for implementing distributed event management of the preferred embodiment in the embedded support processor computer system 100 of FIG. 1.

A sequence of program instructions or a logical assembly of one or more interrelated modules defined by the recorded program means 804, 806, 808, 810, direct the embedded support processor computer system 100 for implementing distributed event management of the preferred embodiment.

While the present invention has been described with reference to the details of the embodiments of the invention shown in the drawing, these details are not intended to limit the scope of the invention as claimed in the appended claims.

What is claimed is:

1. Apparatus for implementing distributed event management in an embedded support processor computer system including at least one main processor, an embedded support processor, and an attached input/output (I/O) device, said apparatus comprising:

a memory;

the main processor and the embedded support processor coupled to said memory;

an event distribution agent included in the embedded support processor for storing process and event information and communicating with local processes of the embedded support processor;

an event distribution agent in the main processor for storing process and event information and communicating with local processes of the main processor;

an event distribution agent in the attached input/output (I/O) device for communicating with local processes in the I/O device;

said event distribution agents providing application programming interfaces (APIs) enabling event management processes including;

a process for dynamically registering and unregistering for events communicates with said event distribution agent of the embedded support processor and dynamically registers and unregisters for one or more events;

a process for dynamically registering and unregistering for events communicates with said event distribution agent of the main processor and dynamically registers and unregisters for one or more events;

a process for dynamically registering and unregistering for events communicates with said event distribution agent of the I/O device and dynamically registers and unregisters for one or more events;

a process for signaling an event to said event distribution agent of the embedded support processor using a local signaling process of the embedded support processor;

said event distribution agent of the embedded support processor notifying each said local process registered for the signaled event of the embedded support processor of the signaled event;

said event distribution agent of the embedded support processor, notifying said event distribution agent of the main processor of the signaled event; and said event distribution agent of the embedded support processor, notifying said event distribution agent of the I/O device of the signaled event.

2. Apparatus for implementing distributed event management in an embedded support processor computer system as recited in claim 1 wherein said event distribution agent in the main processor receives signaled events of registered events of the main processor.

3. Apparatus for implementing distributed event management in an embedded support processor computer system as recited in claim 2 wherein said event distribution agent included in the main processor, responsive to being notified of the signaled event by said event distribution agent in the embedded processor, notifies each said registered local process of the main processor of the signaled event.

4. Apparatus for implementing distributed event management in an embedded support processor computer system as recited in claim 2 wherein said event distribution agent in the main processor notifies said event distribution agent of the embedded support processor of a received signaled event; and responsive to being notified of the received signaled event by said event distribution agent in the main processor, said event distribution agent of the embedded support processor notifies each said registered local process of the signaled event.

5. Apparatus for implementing distributed event management in an embedded support processor computer system as recited in claim 1 wherein said event distribution agent in the input/output (I/O) device receives signaled events of registered events of the I/O device.

6. Apparatus for implementing distributed event management in an embedded support processor computer system as recited in claim 5 wherein said event distribution agent of the I/O device, responsive to being notified of the signaled event by said event distribution agent in the embedded processor, notifies each said registered local process of the I/O device of the signaled event.

7. Apparatus for implementing distributed event management in an embedded support processor computer system as recited in claim 5 wherein said event distribution agent in the I/O device notifies said event distribution agent of the embedded support processor of a received signaled event; and responsive to being notified of the received signaled event by said event distribution agent in the I/O device, said event distribution agent of the embedded support processor notifies each said registered local process of the signaled event.

8. A method for implementing distributed event management in an embedded support processor computer system including an embedded support processor, a main processor, and an attached input/output (I/O) device, said method comprising the steps of:

providing an event distribution agent in the embedded support processor for storing process and event information and communicating with local processes of the embedded support processor;

providing an event distribution agent in the main processor for storing process and event information and communicating with local processes of the main processor; providing an event distribution agent in the attached input/output (I/O) device for communicating with local processes of the I/O device;

providing application programming interfaces (APIs) with said event distribution agents for enabling event management processes including;

dynamically registering and unregistering any local process of the embedded support processor for one or more events with said event distribution agent of the embedded support processor;

dynamically registering and unregistering any local process of the main processor for one or more events with said event distribution agent of the main processor;

dynamically registering and unregistering any local process of the I/O device for one or more events with said event distribution agent of the I/O device;

signaling an event to said event distribution agent of the embedded support processor using a local signaling process of the embedded support processor;

said event distribution agent of the embedded support processor, notifying each said local process registered for the signaled event of the embedded support processor of the signaled event;

said event distribution agent of the embedded support processor, notifying said event distribution agent of the main processor of the signaled event; and said event distribution agent of the embedded support processor, notifying said event distribution agent of the I/O device of the signaled event.

9. A method for implementing distributed event management in an embedded support processor computer system as recited in claim 8 wherein said event distribution agent of the main processor, responsive to being notified of the signaled event by said event distribution agent in the embedded processor, notifies each said local process registered for the signaled event of the main processor of the signaled event.

10. A method for implementing distributed event management in an embedded support processor computer system as recited in claim 8 wherein said event distribution agent of the I/O device, responsive to being notified of the signaled event by said event distribution agent in the embedded processor, notifies each said local process registered for said signaled event of the I/O device of said signaled event.

11. A method for implementing distributed event management in an embedded support processor computer system as recited in claim 10 includes the steps of signaling another event to said event distribution agent of the input/output (I/O) device using a local signaling process of the I/O device.

12. A method for implementing distributed event management in an embedded support processor computer system as recited in claim 11 includes the steps of said event distribution agent of the I/O device, notifying each said local registered process of the I/O device of said another signaled event.

13. A method for implementing distributed event management in an embedded support processor computer system as recited in claim 11 includes the steps of said event distribution agent of the I/O device, notifying said event distribution agent of said embedded support processor of said another signaled event.

14. A method for implementing distributed event management in an embedded support processor computer system as recited in claim 13 includes the steps of said event distribution agent of said embedded support processor, notifying said event distribution agent of said main processor of said another signaled event.

15. A method for implementing distributed event management in an embedded support processor computer system as recited in claim 14 includes the steps of said event distribution agent of the main processor, notifying each said local process registered for said another signal event of the main processor of said another signaled event.

16. A computer program product for implementing distributed event management in an embedded support processor computer system including an embedded support processor, a main processor, and an attached input/output (I/O) device, said computer program product including instructions stored on a computer recording medium consisting one of a floppy disk, an optically read compact disk, a compact disk read only memory (CD-ROM), and a tape, wherein said instructions, when executed by the embedded support processor, and the main processor to cause the embedded support processor computer system to perform the steps of:

providing an event distribution agent in the embedded support processor for storing process and event information and communicating with local processes of the embedded support processor;

providing an event distribution agent in the main processor for storing process and event information and communicating with local processes of the main processor;

providing an event distribution agent in the attached input/output (I/O) device for communicating with local processes of the I/O device;

providing application programming interfaces (APIs) with said event distribution agents for enabling event management processes including;

dynamically registering and unregistering any local process of the embedded support processor for one or more events with said event distribution agent of the embedded support processor;

dynamically registering and unregistering any local process of the main processor for one or more events with said event distribution agent of the main processor;

dynamically registering and unregistering any local process of the I/O device for one or more events with said event distribution agent of the I/O device;

signaling an event to said event distribution agent of the embedded support processor using a local signaling process of the embedded support processor;

said event distribution agent of the embedded support processor, notifying each said local process registered for the signaled event of the embedded support processor of the signaled event;

said event distribution agent of the embedded support processor, notifying said event distribution agent of the main processor of the signaled event; and said event distribution agent of the embedded support processor, notifying said event distribution agent of the I/O device of the signaled event.

\* \* \* \* \*